US008818109B2

(12) United States Patent
Kisilev et al.

(10) Patent No.: US 8,818,109 B2
(45) Date of Patent: Aug. 26, 2014

(54) CONTEXT-AWARE IMAGE PROCESSING (75) Inventors: Pavel Kisilev, Palo Alto, CA (US); Suk Hwan Lim, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2732 days.

(21) Appl. No.: 11/481,346

(22) Filed: Jul. 4, 2006

(65) Prior Publication Data

US 2008/0008396 A1 Jan. 10, 2008

(51) Int. Cl.
G06K 9/64 (2006.01)
G06K 9/40 (2006.01)
G06T 5/00 (2006.01)
G06K 9/46 (2006.01)

(52) U.S. Cl.
CPC ......... G06K 9/40 (2013.01); G06T 2207/20012 (2013.01); G06T 2207/20192 (2013.01); G06T 5/002 (2013.01); G06K 9/4642 (2013.01)
USPC ........... 382/223; 382/303; 382/286; 382/132; 382/172

(58) Field of Classification Search
USPC ................. 382/223, 272, 303, 240, 191, 248
See application file for complete search history.

(56) References Cited

U.S. PATENT DOCUMENTS 5,754,676 A * 5/1998 Komiya et al. ............... 382/132
7,103,215 B2 * 9/2006 Buzuloiu et al. ............. 382/165
2007/0223839 A1 * 9/2007 Kisilev et al. ................ 382/286

OTHER PUBLICATIONS

"Foundations of Fuzzy Logic", http://www.mathworks.com/access/helpdesk/help/toolbox/fuzzy/, pp. 14.*
Foundations of Fuzzy Logic, http://www.mathworks.com/access/helpdesk/help/toolboxlfuzzy/, pp. 14.*
Tomoya Tokairin and Yoshiharu Sato, "Design of Nonlinear Adaptive Digital Filter by Wavelet Shrinkage" Electronics and Communications in Japan, Part 3, vol. 86, No. 2, 2003, pp. 59-71.*
Lily Rui Liang, Carl G. Looney, "Competitive fuzzy edge detection", Applied Soft Computing 3 (2003), pp. 123-137, Jan. 23, 2003.*
Console et al., "New Classification Techniques for Analysis of Remote Sensing Integrated Data", 1997 IEEE, pp. 646-648.*
Johnstone, et al., "Wavelet Threshold Estimators for Data with Correlated Noise," J. Roy. Statist. Soc. Ser. B., 1997, pp. 319-351.
Jung, et al., "Adaptive Image Denoising and Edge Enhancement in Scale-Space Using the Wavelet Transform," Pattern Recognition Letters 24, 2003, pp. 965-971.

(Continued)

Primary Examiner — Mekonen Bekele (57) ABSTRACT

In one respect, provided are systems, methods and techniques in which local regions within an image are processed to provide fuzzy classification scores, which are calculated by determining changes in pixel values along a number of different directions. The resulting fuzzy classification scores are then used to detect or identify edge-containing or texture-containing regions, or to otherwise process the image regions differentially according to their fuzzy classification score. In another respect, provided are systems, methods and techniques for differential processing of different areas in an image. The differential processing in this case is based on calculated measures of local activity, which indicate features in corresponding local regions, and also based on calculated measures of local pixel-value variations, which indicate an amount of variation in pixel values across the corresponding local regions.

18 Claims, 4 Drawing Sheets

(56) References Cited

OTHER PUBLICATIONS

Berkner, et al., "Multiscale Sharpening and Smoothing in Besov Spaces with Applications to Image Enhancement," Applied and Computional Harmonic Analysis 11, 2001, pp. 2-31.

Starck, et al., "Image Decomposition: Separation of Texture from Piecewise Smooth Content," SPIE Annual Meeting, San Diego, California, Aug. 3-8, 2003.

Seemann, et al., "Structure Preserving Noice Filtering of Images Using Explicit Local Segmentation," Proc. ICPR Conf. vol. II, 1998, pp. 1610-1612.

* cited by examiner

CONTEXT-AWARE IMAGE PROCESSING

FIELD OF THE INVENTION

The present invention pertains to a wide variety of image processing techniques, including but not limited to image analysis and image enhancement.

BACKGROUND

A variety of automated image-processing techniques exist. While such conventional techniques are adequate in some situations, each such technique can produce unsatisfactory results under the appropriate set of circumstances. Often, such results are caused by an inherent failure of the technique to properly analyze individual regions within the image. Such a misunderstanding of local image context almost inevitably leads to an improper selection of the appropriate processing technique or processing parameters to be applied.

SUMMARY OF THE INVENTION

The present invention addresses this problem, in one respect, by providing systems, methods and techniques in which local regions within an image are processed to provide fuzzy classification scores which are calculated by determining changes in pixel values along a number of different directions. The resulting fuzzy classification scores are then used to differentially process the image. In another respect, the present invention provides differential processing of different areas in an image based on calculated measures of local activity, which indicate features in corresponding local regions, and also based on calculated measures of local pixel-value variations, which indicate an amount of variation in pixel values across the corresponding local regions.

The foregoing summary is intended merely to provide a brief description of the general nature of the invention. A more complete understanding of the invention can be obtained by referring to the claims and the following detailed description of the preferred embodiments in connection with the accompanying figures.

DESCRIPTION OF THE PREFERRED EMBODIMENT(S)

Figure 1:
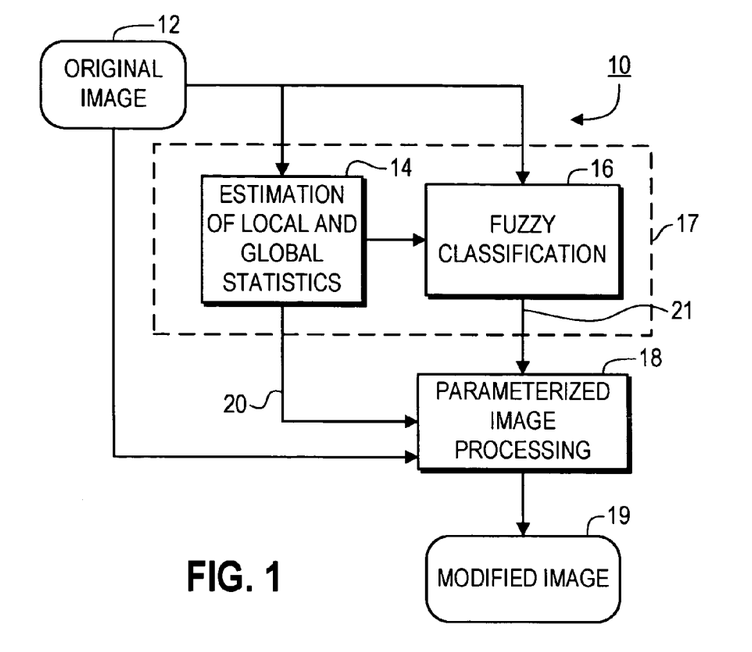
FIG. 1 is block diagram showing a system according to representative embodiment of the present invention.

The image processing techniques of the present invention generally are based on a classification of the local signal, that is, the local image area (e.g., an image block), into one of three fuzzy classes. These classes are: (1) smooth or background areas; (2) weak features, such as texture, and low-contrast edges; and (3) strong features, such as high-contrast edges and lines. This classification is based on local statistics, global statistics or any combination of the two, estimated from given data. For example, a set of classifier parameters according to the present invention may include any combination of: (1) an estimate of the noise across the entire image (e.g., an estimate of the image noise variance $\hat{\sigma}^2$), (2) an estimate of the noise within a local region (e.g., an estimate of the local noise variance within a block or other region m, $\hat{\sigma}_m^2$), (3) an estimate of the pixel-value variation (e.g., variance) across a local region, (4) an estimate of the representative pixel value (e.g., mean pixel value) across a local region, and (5) an estimate of local signal activity (e.g., local sparsity $v_m$, defined below). A block diagram of a system 10 according to representative embodiment of the present invention is shown in FIG. 1. The local regions used for the foregoing purposes may be, e.g., 8×8 pixels or 16×16 pixels.

As indicated, an original input image 12 is processed in local statistics estimation module 14 to calculate specified ones of the above-referenced statistics. The results are provided to classification module 16, which in the preferred embodiments provides a measure of the classification, along a scale from "smooth area" to "weak features" to "strong features" (one example of a fuzzy classification score), and also to image processing module 18. Collectively, estimation module 14 and classification module 16 comprise the image-analysis portion 17 of system 10. Based on the statistics 20 and classification information 21 received from image-analysis portion 17, module 18 performs image processing on original input image 12 and outputs a modified image 19. Such processing might include, e.g., denoising, feature sharpening, compression or defect removal.

In the discussion below, examples of denoising are discussed in some detail. However, it should be understood that the techniques of the present invention are applicable to a wide variety of different image-processing techniques.

As used herein, an image "feature" refers to a line or other boundary where an abrupt change in pixel values occurs. The sharpness of feature refers to how abruptly the pixel values change (e.g., the width of the transition region), while the contrast refers to the difference in pixel values from one side of the transition region to the other. The sharpness and contrasts together determine the strength of the feature.

Initially, we provide some background regarding certain image-processing concepts, particularly denoising techniques, to which the present invention may be applied. Next, we provide a discussion of certain options for estimating the statistics referenced above. After that, we discuss how those statistics are used for fuzzy classification, and finally we discuss how the fuzzy classification metric and other concepts of the present invention may be used for image processing.

Image-Processing Concepts

The techniques of the present invention apply in the context of at least two denoising frameworks, transform domain filtering and bilateral filtering, in addition to other image-processing applications. We describe briefly these two denoising methods.

In the transform domain filtering, local signal $y_l$ is represented by a set of transform domain coefficients; for example, local Discrete Cosine Transform (DCT), or Wavelet Transform (WT) coefficients. For simplicity of presentation, we consider complete representations, such as the (local) DCT or the orthogonal WT. In either case, the analysis and the synthesis coefficients of a signal coincide.

The synthesis and the analysis operations are, respectively:

$$y_l = \sum_{m=1}^{M} c_m \cdot \phi_m(l),$$

$$c_m = \sum_{l=1}^{L} y_l \cdot \phi_m(l),$$

where $\phi_m$, m=1, ..., M are the basis functions, and a symbolic index l can be, for example, a pair of spatial indexes l=[j,k]. Local signal $y_l$ is then represented by means of its coefficients $c_m$.

The filtering of $y_l$ is obtained by modification of transform domain coefficients according to some linear or non-linear operator, or a lookup table, $\Psi(\cdot)$, followed by an inverse transform, i.e., the synthesis operation:

$$\hat{y}_l = \sum_{m=1}^{M} \Psi(c_m) \cdot \phi_m(l),$$

where $\hat{y}_l$ is the filtered (output) signal. Note that in this case the transform coefficients can be seen as local signal predictors.

In the case of bilateral filtering, each pixel value is modified according to a set of local differences whose values typically are subject to some non-linear operation $\tilde{\Psi}(\cdot)$:

$$\hat{y}_l = y_l^0 + K_{norm} \sum_{m=1}^{M-1} \tilde{\Psi}(\tilde{c}_{lm}),$$

where $K_{norm}$ is a normalization constant, $\tilde{c}_{lm}$ are the local differences, $y_l^0$ is either the central pixel of the block l, or the mean (median) of pixel values in the block; M is the total number of pixels in the block. In particular, the zero and the first order bilateral filters are based on the first and the second order simple (spatial) derivatives, $\tilde{c}_{lm}^1$ and $\tilde{c}_{lm}^2$, respectively:

$$\tilde{c}_{lm}^1 = y_{l+m} + y_l^0,$$

$$\tilde{c}_{lm}^2 = y_{l+m} + y_{l-m} - 2y_l^0.$$

Note that, similar to the case of transform-domain denoising, the estimated local signal is represented by local predictors, namely the $\tilde{c}_{lm}$ values.

There are several approaches to transform-domain image denoising. One denoising algorithm applies thresholding to the subset of high-resolution wavelet transform (WT) coefficients of a noisy signal. It effectively zeros all the coefficients with magnitudes below a calculated threshold. The threshold value depends only on the sample size and on the noise variance estimated from given data. Coefficients with magnitudes higher than the threshold are either not modified (the hard thresholding), or subtracted by the value of the threshold (the soft thresholding).

The so-called universal threshold used in one approach is:

$$t^u = C_k \hat{\sigma},$$

$$C_k = \sqrt{2\log K}/0.6745, \quad \text{(Eq. 1)}$$

where K is the number of samples (coefficients) in the signal representation, $\hat{\sigma}$ is the estimated noise standard deviation (std), and the factor 0.6745 is used for calibration related to the Gaussian noise assumption.

The following result justifies the above choice of threshold. Let $\{x_i\}$ be normally distributed $N(0,\sigma_i^2)$, not necessarily independent, random variables. Then, it has been shown that $$P\left(\max_{i=[1,\dots,K]} |x_i/\sigma_i|\right) > \sqrt{2\log K} \to 0 \text{ for } K \to \infty.$$

The above probability has a maximum of $1/\sqrt{4\pi \log K}$. This implies that setting the threshold as set forth above ensures that virtually no noise spikes will be left after thresholding operation. Note, though, that this threshold value is very high and might destroy feature coefficients, causing a signal distortion (e.g., blurring).

Another approach to transform-domain denoising is based on statistical properties of the transform coefficients, and utilizes the Bayesian framework. In this approach, the exponential density is used as a model for the probability density function (pdf) of WT coefficients. Under this assumption, the solution of the problem of denoising is the maximum a posteriori (MAP) estimator, described in terms of statistics of the transform-domain coefficients. Alternatively, under the mean-squared error (MSE) criterion, the mean of the posterior distribution is an optimal estimator. The MAP approach leads to either soft or approximately hard thresholding non-linearity, depending on the sparsity parameter of the distribution of a complete set of WT coefficients. The MSE approach leads to a somewhat smooth version of the hard thresholding non-linearity.

The above two methods are based on application of a non-linear function to all WT coefficients. The shape of this non-linear function is dependent on the statistical properties of the WT coefficients, that is, on the hypothetical pdf. The parameters of the distribution usually are unknown in advance. Estimation of these parameters along with the estimation of noise variance typically represents a difficult optimization problem. In addition, sensitivity of the denoiser performance to the accuracy of the model (that is, how close the hypothetical pdf is to the true one), as well as to estimation errors of the model parameters, is not well established.

Estimation of Statistics

The discussion in this section concerns the processing performed in estimation model 14. More specifically, certain options for calculating the statistics mentioned above are described.

One possible choice for estimating noise is the noise standard deviation estimate, e.g., calculated as the median absolute deviation (MAD) from zero of the high-resolution WT coefficients, i.e.:

$$\hat{\sigma} = MAD\{c\}/0.6745, \quad \text{(Eq. 2)}$$

where c is the complete set of high resolution coefficients for image 12, and the factor 0.6745 is used as a calibration for the Gaussian distribution. This estimate is affected by the image features, and, therefore, often overestimates the noise level. More accurate noise estimates generally can be obtained based on the order statistics of the local variances, e.g., as described in commonly assigned U.S. patent application Ser. No. 11/388,152 titled "Signal Noise Estimation", to the present inventor, Doron Shaked and Mani Fischer, filed on Mar. 22, 2006 (the "SNE Application"), which application is incorporated by reference herein as though set forth herein in full.

In many cases of practical interest the noise is luminance-dependent. In such cases, in the preferred embodiments the luminance range is adaptively segmented into M (typically up to 10) intervals, with an approximately equal number of blocks in each interval. Then, statistical noise estimation (e.g., as described in the SNE Application) is applied to each interval. The M resulting noise-variance values are interpolated to a function $\hat{\sigma}_n^2$ (L), where L is a local luminance; $\hat{\sigma}_n^2$ (L) is then translated into a pixel-wise noise-variance map $\hat{\sigma}_n^2$ (j,k).

The local noise variance $\hat{\sigma}_m^2$ also can be estimated as a median absolute deviation of local block coefficients from zero, similar to Equation 2 above, but replacing a complete set of coefficients for the image with a subset of local coefficients. As above, the coefficients participating in this estimate can be either transform domain coefficients (e.g., WT or DCT) or, alternatively, can be calculated as local pixel absolute deviations from the block sample mean.

The most straightforward estimation of pixel-value variation is the sample variance for a given block (or other region) m, calculated from the block samples $y_{km}$, i.e., $$s_m^2 = \frac{1}{K-1} \sum_{k=1}^{K} (y_{km} - \bar{y}_m)^2,$$

where $\bar{y}_m$ is the block sample mean, $$\bar{y}_m = \frac{1}{K} \sum_{k=1}^{K} y_{km}.$$

The sample variance is affected by features appearing in a local block.

We next discuss certain techniques for determining local "activity" of an image. Generally speaking, the local activity of an image signal is concerned with some measure of the image features (e.g., changes in pixel values within small intervals, such as 2-3 pixels) within each local region. An example of the local activity measure is the local sparsity of an image signal.

Various definitions of sparsity can be found in the literature. The most commonly used sparsity measure is based on $l^0$ norm of the coefficients, that is the number of non-zero elements in a set. This definition does not take into account the magnitudes of non-zero elements. As a result, it is very sensitive to noise contamination, because even small noise values turn a very sparse signal into completely not sparse.

In the preferred embodiments of the invention, we use the $l_t^p$-norm based sparsity measures, which utilize a thresholding operation. The corresponding normalized local sparsity can be defined by $$v_{m,p,t_m} = \frac{\sum_{k:|c_k|>t_m} |c_{km}|^p}{\sum_k |c_{km}|^p},$$

where $c_{km}$ are either the transform domain coefficients of the local image block (in the case of transform-domain processing) or the absolute deviations of the block pixels from the block mean or from the block median value (in the case of the bilateral-based processing).

Depending on a particular application, the threshold $t_m$ can be dependent on global or local statistics. In the preferred embodiments, if the noise is stationary over the image, the threshold is dependent on the noise variance estimate $\hat{\sigma}^2$, e.g., calculated according to Equation 1 above, and it is constant over the whole image. In contrast, if the noise is not stationary over the image (e.g., luminance-dependent noise), then in the preferred embodiments $t_m$ is dependent on local statistics, for example the estimated local variance $s_m^2$, or the estimated local noise variance. In this case, the local threshold value can be calculated according to $t_m = C_k \cdot s_m$.

Note that the sparsity measure $v_{m,0,t_m}$ with parameter p=0 is proportional to the number of local block coefficients which are greater than a threshold value. This measure is virtually independent of the feature contrast (or strength), and emphasizes existence or, roughly speaking, the number of features in a block. This implies that strong and weak features, whose coefficients are greater than the above threshold, can arrive at the same sparsity value. In contrast, the $v_{m,1,t_m}$ and $v_{m,2,t_m}$ measures emphasize the relative energy of outliers (e.g., edges). As a result, a small number of coefficients having high magnitudes can yield the same sparsity value as a greater number of coefficients having intermediate magnitudes. The use of one or another measure is therefore imposed by a particular application; also, it should be noted that a combination of the above sparsity measures can be used.

The sparsity measures described above are examples of non-directional image-signal activity. However, in many instances, for reasons described in more detail below, it is desirable to use directional measures of signal activity.

Also, in certain embodiments it is desirable to measure the local feature content with respect to the local noise level $\hat{\sigma}_n^2(j,k)$. Depending on the particular embodiment, feature map values f (j, k) are calculated based on non-directional measures (e.g., the sparsity values mentioned above) or directional measures. In either case, the local noise level $\hat{\sigma}_n^2(j,k)$, or at least a global noise estimate, preferably is taken into account.

An example of another activity measure is as follows. Let $\hat{\sigma}_n^2(j,k)$ be the pixel-wise noise-variance map. In this embodiment, we measure the local feature content with respect to the local noise level $\hat{\sigma}_n^2(j,k)$. More specifically, we calculate the signal activity (feature) map values as:

$$f(j,k) = \frac{\sum_{m:|dI_m|>3\hat{\sigma}_n(j,k)} |dI_m(j,k)|^p}{\sum_m |dI_m(j,k)|^p},$$

where $dI_m$ are local directional derivatives (e.g., differences between a pixel and its neighbors). Such directional derivatives preferably are calculated across at least three pixels in the selected direction (or orientation), with the subject pixel being an interior pixel along such direction. For example, the local directional derivative may be calculated as $dI=Y_0-(Y_{+1}+Y_{-1})/2$, where $Y_0$ is the pixel of interest (j,k), $Y_{+1}$ is the pixel immediately adjacent it along the selected direction, and $Y_{-1}$ is the pixel immediately adjacent it along the opposite of the selected direction. Large values in this case indicate an edge along an angle that is orthogonal to the selected direction.

Figure 3:
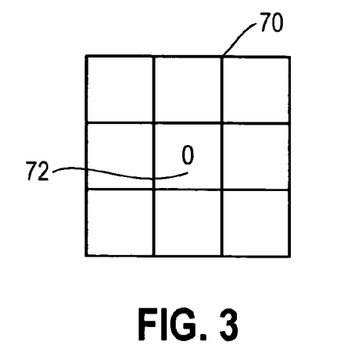
FIG. 3 illustrates a pixel map for a block of pixels that are used for determining directional derivatives according to a representative embodiment of the present invention.
Figure 4A:
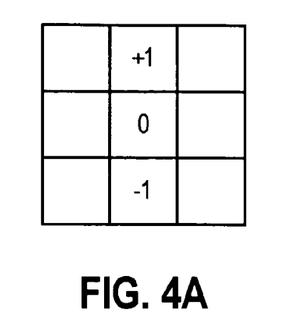
FIGS. 4A-D illustrate pixel maps showing the calculation of different directional derivatives according to a representative embodiment of the present invention.
Figure 4B:
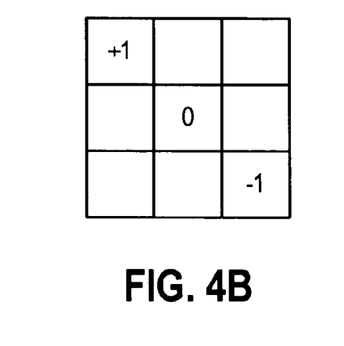
Figure 4C:
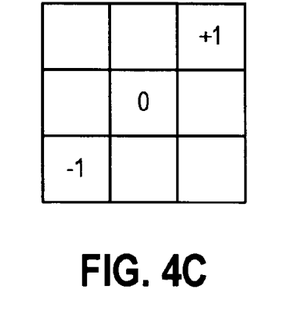
Figure 4D:
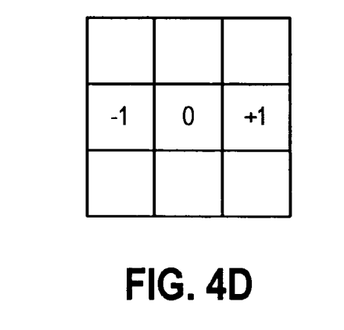

Consider a 3×3 block 70 centered at a given pixel (j,k) 72, as shown in FIG. 3. We can evaluate four different directional derivatives (m=1 . . . 4), as shown in FIGS. 4A-D (in which the pixels are labeled with their corresponding Y subscripts).

For p=1 (or, for that matter, for p>0), f(j,k) depends on the feature strength (e.g., contrast and sharpness), thus emphasizing strong features (edges). For p=0, f(j,k) is virtually independent of feature contrast (e.g., counting the number of edges), and therefore emphasizes textures. The value of p may be set by a user, e.g., an individual or a software program that is accessing the functionality of the present invention, thereby providing some degree of control over the technique's sensitivity to feature strength (as opposed to feature quantity).

In this specific embodiment, we are looking only at directional derivatives that exceed three times the local noise std. In alternate embodiments, other functions of the local (or global) noise std (or other estimate) are used. According to still further embodiments, activity can be calculated without any reference to noise at all. For example, in certain embodiments the threshold is set based on the values of the directional derivatives themselves (e.g., a function of the average magnitude of the directional derivatives).

The measures of activity described herein can be used as a form of membership score (or a fuzzy classification measure) with respect to the three different classes identified above. High scores (or measures) indicate significant feature-containing regions. Intermediate scores indicate texture or weaker features (e.g., lower contrast or blurrier feature edges). Low scores indicate plain, only mildly changing or background regions.

Fuzzy Local Classification and Image Processing

The discussion in this section concerns the processing performed in classification module 16 and in image-processing module 18. There exist many ways for module 16 to perform fuzzy classification and for module 18 to utilize the classification results in its image processing. Several examples are given below.

In general, the shape of the local non-linear operator, applied to local pixel predictors (local, transform domain coefficients or local pixel differences), is a function of the membership score of a given area. In the following disclosure, we describe different ways to adapt local nonlinearities to a local context.

We first describe a simple, yet very effective, approach to building an activity-based classifier (sparsity-based in the present embodiment), and to applying it to local context-sensitive denoising technique. A bilateral filer can be used as a denoiser building block. The hard-thresholding function is applied to the local pixel differences.

Note that in the case of a standard bilateral filter, the threshold $t^{hard} \equiv t^u = C_k \cdot \hat{\sigma}$ is constant over the whole image. Instead, in the proposed context-aware approach, we calculate a locally adaptive threshold whose value is dependent on the estimated global (or local) noise variance (or other noise estimate) and the local sparsity (or other measure of activity), e.g., as follows:

$$t_m^{hard} = t^u(\hat{\sigma}) \cdot (1 - v_{m,0,t_m})^{q(\hat{\sigma})} \quad \text{(Eq. 3)}$$

where $(1 - v_{m,0,t_m})^{q(\hat{\sigma})}$ is the locally adaptive threshold-correction map, calculated either pixel- or block-wise, and a confidence parameter $q(\hat{\sigma})$ is a function proportional to the estimated noise std. For example, a simple function $q(\hat{\sigma}) = C_n/\hat{\sigma}$ can be used, where $C_n$ is the lowest noticeable noise level; in the inventor's experiments, $C_n = 4$ yields good results.

The heuristics underlying the threshold-calculation function in Equation 3 above are as follows. If the local sparsity value $v_{m,0,t_m}$ (or other measure of activity that is used) is close to zero, this indicates that the local area contains no features. Such an area is denoised in the preferred embodiments of the invention by hard thresholding according to the threshold given in Equation 1 above. On the other hand, the closer the value $v_{m,0,t_m}$ is to 1, the busier (with image features) is the local area, and in such cases the threshold value $t_m^{hard}$ approaches zero. Accordingly, in the preferred embodiments no (or very little) modification is done to the pixel values in such areas.

Furthermore, the confidence parameter q in the term $(1 - v_{m,0,t_m})^q$ in Equation 3 above is dependent on the estimated global noise std. The influence of this parameter on values of the threshold $t_m^{hard}$ is as follows. Assume, for example, $q(\hat{\sigma}) = 4/\hat{\sigma}$. Then, if the noise std is below four gray levels, the values of the term $(1 - v_{m,0,t_m})$ are modified according to a concave nonlinear function. This effectively raises the confidence in values of $v_{m,0,t_m}$, and therefore increases the influence of sparsity on the threshold value calculated in accordance with Equation 3 above. In other words, the threshold value $t_m^{hard}$ can drift further away from its reference value $t^u$ (that is, from the universal threshold) toward zero, based on the same sparsity values.

In contrast, if the noise std is larger than four gray levels, then the values of the term $(1 - v_{m,0,t_m})$ are modified according to a convex nonlinear function. This effectively lowers the confidence in values of $v_{m,0,t_m}$, and therefore decreases the influence of sparsity on the threshold value calculated in accordance with Equation 3 above. This means that at higher noise levels, the threshold $t_m^{hard}$ remains closer to the reference value $t^u$.

The resulting locally adaptive threshold correction map represents a sparsity-based fuzzy classifier, and can be used for various image-analysis and image-processing purposes. Low values in the map generally correspond to the class of smooth, feature-free areas. Intermediate values correspond to feature-containing image areas. High values correspond to areas having strong features.

It should be noted that any other measure of activity may be used in the foregoing embodiment. Similarly, in any other examples in which a sparsity measure is used herein, any other measure of activity may be used instead. Thus, the example given above may be generalized as follows:

$$t_m^{hard} = t^u(\hat{\sigma}) \cdot (1 - f(j,k))^{q(\hat{\sigma})}.$$

Now we describe a fuzzy denoising method that the present inventor has applied in a DCT-based denoising technique. In this context, coefficients corresponding to edges have high magnitudes, particularly the higher-frequency coefficients, so the threshold can be set higher in edge-containing regions. At the same time, do not want to distort edges. Therefore, in the preferred embodiments local coefficients of the edge-containing areas are modified by the hard thresholding non-linear operator, with a relatively high threshold value (e.g., achieved by the maximum operator). For example, in the areas identified as edge-containing (based on the coefficients) we can calculate the threshold as follows:

$$t_{edge}^{hard} = C_k \cdot \max(s_m, \hat{\sigma}) \cdot (1 - v_{m,0,t_m})^{q(\hat{\sigma})}.$$

The coefficients (particularly the middle- and higher-frequency ones) corresponding to textures usually have lower magnitudes than the edge-containing areas. Accordingly, the threshold is set lower in such regions. In addition, we want to reduce any feature distortion. Accordingly, in the preferred embodiments local coefficients of the texture-containing regions again are modified by the hard thresholding non-linear operator, but with a relatively lower threshold value (e.g., achieved by the minimum operator). For example, in the areas identified as texture-containing (based on the coefficients) we can calculate the threshold as follows:

$$t_{texture}^{hard} = C_k \cdot \min(s_m, \hat{\sigma}) \cdot (1 - v_{m,0,t_m})^{q(\hat{\sigma})}.$$

In the background areas (e.g., characterized by low-magnitude coefficients corresponding to the intermediate and high frequencies), we want to achieve maximum smoothing. In the preferred embodiments, this goal is achieved by application of the soft thresholding non-linear operator with a relatively high threshold value, such as:

$$t_{bckg}^{soft} = C_k \cdot \max(s_m, \hat{\sigma}) \cdot (1 - v_{m,0,t_m})^{q(\hat{\omega})}.$$

In the foregoing technique, a hard classification is made for each region and the determination dictates how the threshold is calculated and applied in that region. At the same time, fuzzy classification is used within each individual class, based on the sparsity measure $v_{m,0,t_m}$. As before, any other measure up activity may be used instead of the sparsity $v_{m,0,t_m}$. It is noted that this method is relatively insensitive to the non-stationarity of the noise over the image, because the threshold is a function of both global and local variances.

Figure 2:
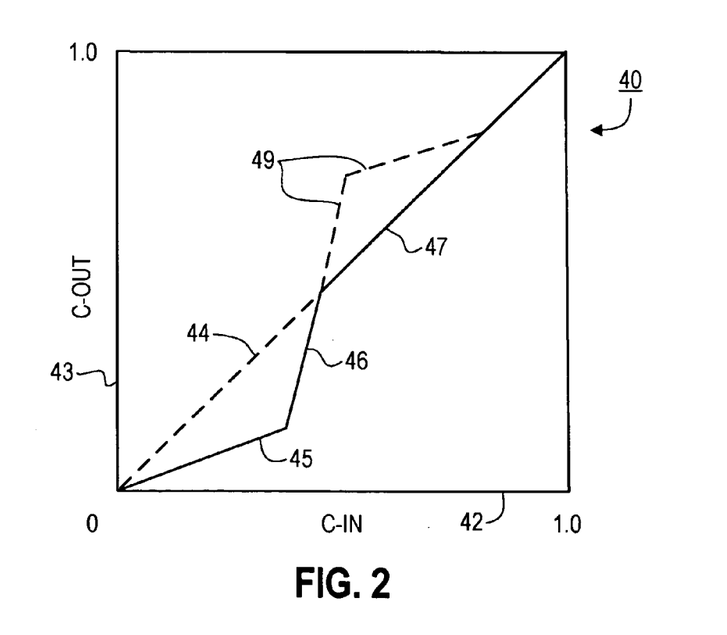
FIG. 2 illustrates a piece-wise linear function for transforming image coefficients according to a representative embodiment of the present invention.

In an alternate embodiment of the invention, the local non-linearity is constructed as a piece-wise function, e.g., the piece-wise linear function illustrated in FIG. 2. More specifically, FIG. 2 illustrates a graph 40 showing how input coefficients (on horizontal axis 42) are converted into output coefficients (on the vertical axis 43). For reference purposes, the reference identity line 44 (at which the input coefficients would be unmodified) also is shown in FIG. 2. In the present embodiment, each one of the segments 45-47 of the non-linearity has a non-zero slope. Generally speaking, the first segment 45 corresponds to the smooth or background coefficients, the second segment 46 corresponds to the texture coefficients, and the third segment 47 corresponds to the edge coefficients.

More specifically, the coefficients below the threshold value $t_m$ (corresponding to segment 45) are not zeroed, but rather modified according to the estimated local noise level and according to the local signal energy. The idea behind this approach is that the small-magnitude high resolution coefficients of a noise-free signal (e.g., the texture coefficients) generally are not distributed exponentially (like the edges are), but rather according to a less-sparse (e.g., Gaussian) distribution. If the noise pdf also is Gaussian, then a well-known solution for the filtering problem under the MSE criterion is Wiener filtering. In this case, the coefficients are modified according to:

$$\hat{c}_{km} = c_{km} \frac{r_m^2}{r_m^2 + s_m^2},$$

where $s_m^2$ is the estimated local noise variance, as before, and $r_m^2$ is the estimated weak signal variance, which may be estimated, e.g., by:

$$r_m^2 = \frac{1}{K_m} \sum_{k:|c_{km}|>t_m} c_{km}^2,$$

where $K_m$ is the number of coefficients in the block m that are greater then the threshold $t_m$.

In the present embodiment, the next linear segment 46 of the non-linearity begins at the threshold value $t_m$ and ends at the point of crossing the identity line 44. In this embodiment, the slope $\alpha$ of segment 46 varies from 45° to 90° with respect to the horizontal axis, with $\alpha$ being determined as a function of the membership score of the local signal. The closer the local signal is to the edge-containing class, the steeper the slope (and, conversely, the closer to the background class, the more gradual the slope). In the two extreme cases, the slope of 90° corresponds to the edge-containing class membership of 1; conversely, the slope of 45° corresponds to the background class membership of 1. In general, the segment 46 modifies those coefficients of the local signal that have intermediate magnitudes.

The coefficients for the last segment 47 (generally corresponding to the edge coefficients) can be either not modified at all (which corresponds to the identity slope 44, as is the case for segment 47 in the specific embodiment shown in FIG. 2). Alternatively, such coefficients can be magnified by some factor. This means that the non-linearity at this segment is somewhat above the identity (e.g., corresponding to the piece-wise nonlinear curve 49 in FIG. 2). This latter operation (i.e., corresponding to curve 49) performs sharpening of strong image features.

The foregoing technique performs fuzzy classification because the coefficients are modified based on their values and, in certain cases, based on the fuzzy classification score. In somewhat modified embodiments, the modification of the coefficients (particularly for the transform-domain case) is based on the frequencies to which the coefficients pertain, e.g., with the foregoing modifications being applied in a more pronounced manner to the higher-frequency coefficients.

Further Applications to Image Processing

In the embodiments described above, a fuzzy classification is made based on the local activity of various regions or locations within the input image 12. The measure of local activity generally focuses on changes over a much smaller interval than that used for determining pixel-value variation (e.g., variance). As a result, it can be made much more sensitive to image features than a simple variance calculation.

Figure 5:
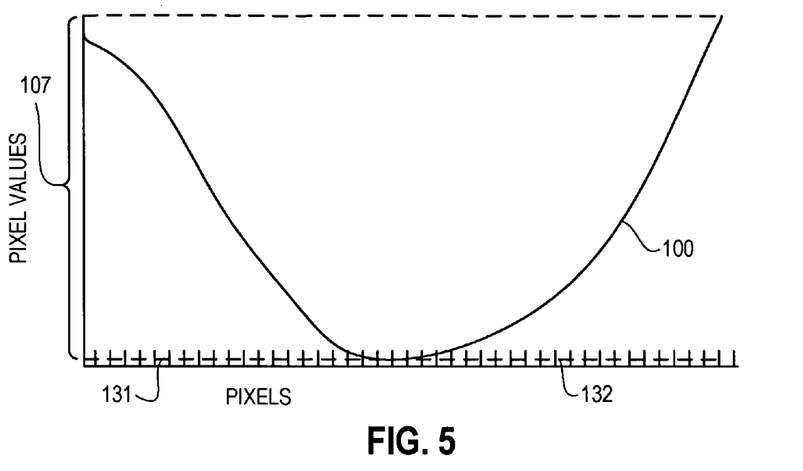
FIG. 5 illustrates a representative texture pattern.
Figure 6:
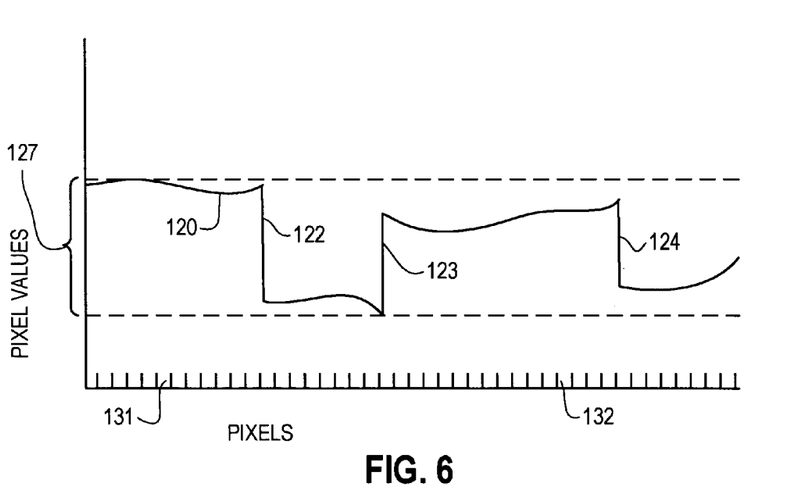
FIG. 6 illustrates a representative feature pattern.

This is illustrated with reference to FIG. 5 and FIG. 6. Each of such figures illustrates a different image pattern taken along a single line. In particular, FIG. 5 shows a pattern 100, with relatively slowly varying pixel values. FIG. 6, in contrast, shows a typical pattern 120 for a region containing a plurality of edges 122-124. For each of patterns 100 and 120, the pixel-value variation would be determined over the entire region illustrated. However, the activity is determined using a much smaller interval, e.g., intervals 131 and 132. Thus, even though pattern 120 has a much smaller the pixel-value variation 127 than the pixel-value variation 107 for pattern 100, pattern 120 still would be classified as belonging to a more feature-rich region than pattern 100.

In certain embodiments of the invention, these two different measures are utilized together to classify local regions of the input image 12. In addition, as noted above, other measures also may be used.

Figure 7:
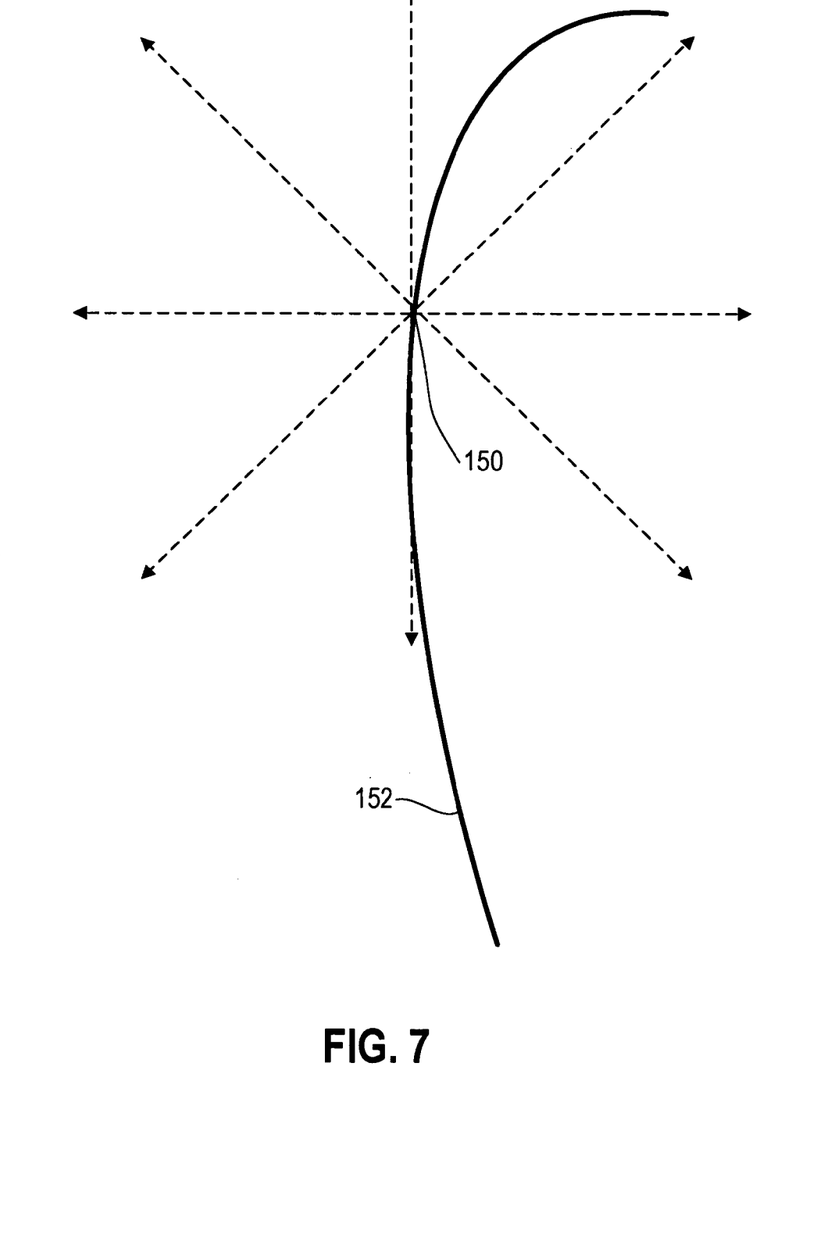
FIG. 7 illustrates the evaluation of pixel-value changes for a plurality of different directions according to a representative embodiment of the present invention.

Image activity is further refined in certain embodiments of the invention by considering directional changes in pixel values along a plurality of different directions. This is illustrated for a representative pixel 150 in FIG. 7. By determining pixel-value variations in different directions, such activity measures often are better able to distinguish edge pixels from random noise pixels and the like.

Maps of the measures calculated according to the present invention can be combined in various ways. For example, the present inventor has combined noise and Feature maps for feature-dependent image enhancement, based on Biselective denoising-sharpening filter. The filter threshold (separating noise and features) is selected to be $$th(j,k) = \alpha \cdot \hat{\sigma}_n^2(j,k) / f(j,k),$$

thus, improving denoising in smooth regions, and sharpening details in feature containing areas. More generally, such image processing can use threshold map $th(j,k) \propto \eta(\hat{\sigma}_n^2(j,k)/$ f(j,k)), where function η is chosen heuristically or follows a noise-sensitivity function of the human psycho-visual system.

Multi-Resolution Processing

The following discussion provides additional options for performing the processing described above. These techniques are related to disclosure set forth in commonly assigned U.S. patent application Ser. No. 11/174,686 titled "Multi-Resolution Processing Of Digital Signals" which was filed on Jul. 5, 2005, which application is incorporated by reference herein as though set forth herein in full.

A downsampled image has very similar signal characteristics as the original image. A smoothing operation typically is performed prior to downsampling in order to avoid aliasing.

In alternate embodiments of the invention, the downsampled image is used to perform fuzzy classification (i.e., to determine whether the corresponding location contains background, weak edges or strong image feature) rather than the original image. In this case, $\hat{\sigma}$ is estimated for the downsampled image as well. There are advantages of using the downsampled image. First, due to the smoothing operation before downsampling, the noise level in the downsampled image typically is lower than in the original image, and hence the classification can be performed more reliably and robustly. Second, due to the smaller number of pixels in the downsampled image, the computational complexity is reduced. For example, if we perform 2×2 downsampling on a 4 Megapixel image, the downsampled image is a 1 Mega pixel image which has ¼ the number of pixels.

In this case, the output of the fuzzy classification is a downsampled image. When performing parameterized image processing we can apply the appropriate type of image processing to the corresponding pixels in the original image. This is equivalent to upsampling the downsampled classification.

Still further, a more complete multi-resolution extension can be performed, e.g., using the techniques described in the Multi-Res Application. There, we developed a new multi-resolution approach specifically designed and well-equipped for removing the low-frequency (LF) noise and error. Alternatively, any other multi-resolution denoising approach can be used.

In the technique of the Multi-Res Application, we first construct a Gaussian Pyramid with N+1 levels via simple smoothing followed by subsampling. The pyramid construction can be summarized as $I_{k+1}$=Subsample[Smooth($I_k$)] (k=0, ..., N−1), where $I_k$ is the $k^{th}$ level image. Note that $I_0$ is the original input image and the top $N^{th}$ level image ($I_N$) is obtained by smoothing and downsampling the $I_0$ image N times. We then apply denoising to the $N^{th}$ level ($I_N$) and propagate the result to the next lower level ($I_{N-1}$) such that the LF noise in $I_{N-1}$ is removed. The denoising and propagation is repeated for each level (from levels N−1 to 0), which can be summarized as $I_k^*$=Denoise[$I_k$+Upsample($I^*_{k+1}$−$I_{k+1}$)] (k=N−1, ..., 0), where $I_k^*$ is the denoised image at $k^{th}$ level and the final denoised output image is $I_0^*$. Note that the propagation is performed by computing the difference between the images before denoising ($I_{k+1}$) and after denoising ($I^*_{k+1}$) followed by an upsample operation (simple pixel replication or bilinear interpolation). As the high-frequency (HF) component of the upper pyramid levels correspond to the LF components in the original level, removing HF noise in the upper pyramid levels correspond to removing LF noise in the lower pyramid levels after series of propagations.

The context-aware image processing and this new multi-resolution image processing can be nicely combined and we can get benefits from both of them simultaneously. To do this, the output from level k+1($I^*_{k+1}$) can be used to perform the classification and aid the denoising process of the level k (i.e. $I^*_k$=Denoise[$I_k$+Upsample($I^*_{k+1}$−$I_{k+1}$)]). In other words, the output of level k+1 "guides" the process of denoising of the input image at level k. Note that the current description of using the original image to perform the fuzzy local classification can be thought of as "self-guidance". In some cases, where the noise has significant LF content or when the signal-to-noise ratio is very low, it may be beneficial to combine the multi-resolution approach with context-aware approach for robustness of the classification.

It is noted that features in images (e.g., edges and various textures) often reveal a multi-scale nature. Features of various sizes (e.g. edges of various widths) can be present in the same image. Furthermore, features themselves might contain different components of various scales. Therefore, in order to detect such features, we use a multi-scale image transformation (or representation).

In the techniques described above, this is performed, in one set of embodiments, by a downsample-and-average operation, applied to the original image, followed by a recursive downsample-and-average applied to resulting images. According to a second set of embodiments, we create images at several resolutions based on multi-scale transforms, such as the Wavelet Transform, or the Wavelet Packets. After a set of images at various resolutions is created, the feature detection method (or, feature map calculation) is applied to each one of the images, yielding feature maps for each one of the images in the set. Finally, these maps of features are used separately for each scale (e.g., in the multi-scale image enhancement framework). Alternatively, the maps are combined appropriately by some Boolean operation (e.g., 'AND'), or by linear or nonlinear weighting function (e.g., averaging) into a single feature map. According to a third set of embodiments (e.g., using the techniques of the Multi-Res Application), larger scale maps are used as a 'reliable reference' for smaller scale map(s), as the latter are noisier, in general.

System Environment.

Generally speaking, nearly all of the methods and techniques described herein can be practiced with the use of a general-purpose computer system. Such a computer typically will include, for example, at least some of the following components interconnected with each other, e.g., via a common bus: one or more central processing units (CPUs), read-only memory (ROM), random access memory (RAM), input/output software and circuitry for interfacing with other devices and for connecting to one or more networks (which in turn, in many embodiments of the invention, connect to the Internet or to any other networks), a display (such as a cathode ray tube display, a liquid crystal display, an organic light-emitting display, a polymeric light-emitting display or any other thin-film display), other output devices (such as one or more speakers, a headphone set and a printer), one or more input devices (such as a mouse, touchpad, tablet, touch-sensitive display or other pointing device; a keyboard, a microphone and a scanner), a mass storage unit (such as a hard disk drive), a real-time clock, a removable storage read/write device (such as for reading from and writing to RAM, a magnetic disk, a magnetic tape, an opto-magnetic disk, an optical disk, or the like), and a modem (which also preferably connect to the Internet or to any other computer network via a dial-up connection). In operation, the process steps to implement the above methods, to the extent performed by such a general-purpose computer, typically initially will be stored in mass storage (e.g., the hard disk), are downloaded into RAM and then executed by the CPU out of RAM.

Suitable computers for use in implementing the present invention may be obtained from various vendors. Various types of computers, however, may be used depending upon the size and complexity of the tasks. Suitable computers include mainframe computers, multiprocessor computers, workstations, personal computers, and even smaller computers such as PDAs, wireless telephones or any other appliance or device, whether stand-alone, hard-wired into a network or wirelessly connected to a network. In addition, although a general-purpose computer system has been described above, in alternate embodiments a special-purpose computer instead (or in addition) is used. In particular, any of the functionality described above can be implemented in software, hardware, firmware or any combination of these, with the particular implementation being selected based on known engineering tradeoffs. In this regard, it is noted that the functionality described above primarily is implemented through fixed logical steps and therefore can be accomplished through programming (e.g., software or firmware), an appropriate arrangement of logic components (hardware) or any combination of the two, as is well-known in the art.

It should be understood that the present invention also relates to machine-readable media on which are stored program instructions for performing the methods of this invention. Such media include, by way of example, magnetic disks, magnetic tape, optically readable media such as CD ROMs and DVD ROMs, semiconductor memory such as PCMCIA cards, etc. In each case, the medium may take the form of a portable item such as a small disk, diskette, cassette, etc., or it may take the form of a relatively larger or immobile item such as a hard disk drive, ROM or RAM provided in a computer.

The foregoing description primarily emphasizes electronic computers. However, it should be understood that any other type of computer instead may be used, such as a computer utilizing any combination of electronic, optical, biological and chemical processing.

Additional Considerations.

Several different embodiments of the present invention are described above, with each such embodiment described as including certain features. However, it is intended that the features described in connection with the discussion of any single embodiment are not limited to that embodiment but may be included and arranged in various combinations in any of the other embodiments as well, as will be understood by those skilled in the art.

Similarly, in the discussion above, functionality sometimes is ascribed to a particular module or component. However, functionality generally may be redistributed as desired among any different modules or components, in some cases completely obviating the need for a particular component or module and requiring the addition of new components or modules. The precise distribution of functionality preferably is made according to known engineering tradeoffs, with reference to the specific embodiment of the invention, as will be understood by those skilled in the art.

Thus, although the present invention has been described in detail with regard to the exemplary embodiments thereof and accompanying drawings, it should be apparent to those skilled in the art that various adaptations and modifications of the present invention may be accomplished without departing from the spirit and the scope of the invention. Accordingly, the invention is not limited to the precise embodiments shown in the drawings and described above. Rather, it is intended that all such variations not departing from the spirit of the invention be considered as within the scope thereof as limited solely by the claims appended hereto.

What is claimed is:

1. A method of processing an image, comprising:
    obtaining an image to be processed;
    calculating via a central processing unit a classification score for each of a plurality of locations in the image, each of the classification scores indicating whether the corresponding location primarily contains (i) background, (ii) at least one of texture or weak edges, or (iii) strong features; and
    differentially processing via the central processing unit different areas of the image based on the classification scores to generate a modified image, wherein each of the classification scores is calculated by determining changes in pixel values along a plurality of different directions,
    wherein the differential processing is a piece-wise function of data in the image, the piece-wise function comprised of different segments determined b each of the classification scores.

2. A method according to claim 1, wherein each of the classification scores is a fuzzy classification score that indicates on a sliding scale whether the corresponding location primarily contains (i) background, (ii) at least one of texture or weak edges, or (iii) strong features.

3. A method according to claim 1, wherein each of the classification scores is used to set a threshold for determining whether to modify coefficients corresponding to image data in the corresponding location.

4. A method according to claim 1, further comprising a step of making hard classifications of data within the image into specific classes, wherein use of the thresholds in the differential processing is based on the hard classifications, and wherein the hard classifications are used to select between hard thresholding and soft thresholding.

5. A method according to claim 1, wherein pixel-value changes in a given direction supplement each of the classification scores only if they are larger in magnitude than a specified threshold, and wherein the threshold is a function of an applicable noise estimate.

6. A method according to claim 1, further comprising a step of permitting adjustment of an amount of emphasis placed on feature strength when each of the classification scores are calculated.

7. A method according to claim 1, wherein the change in pixel values along a given direction it is calculated across at least three pixels.

8. A method according to claim 1, further comprising a step of obtaining a lower-resolution version of the image, and wherein each of the classification scores is based on the lower-resolution version.

9. A method of processing an image, comprising:
    obtaining an image to be processed;
    calculating via a central processing unit measures of local activity in a first set of local regions in the image, the measures of local activity measuring features in corresponding local regions in the first set;
    calculating via the central processing unit measures of local pixel-value variations for a second set of local regions in the image, the measures of local pixel-value variations measuring an amount of variation in pixel values across the corresponding local regions; and
    differentially processing via the central processing unit different areas of the image based on the measures of local activity and the measures of local pixel-value variations to generate a modified image, wherein the differential processing is a piece-wise function of data in the image, the piece-wise function comprised of different segments determined b the measures of local activity.

10. A method according to claim 9, wherein each measure of local activity is calculated by determining changes in pixel values along a plurality of different directions.

11. A method according to claim 10, wherein pixel-value changes in a given direction supplement the measure of local activity only if they are larger in magnitude than a specified threshold, and wherein the threshold is a function of an applicable noise estimate.

12. A method according to claim 9, further comprising a step of using the measures of local activity to determine classification scores indicating on a sliding scale whether the corresponding regions primarily contain (i) background, (ii) at least one of texture or weak edges, or (iii) strong features.

13. A method according to claim 9, wherein each measure of local activity is used to set a threshold for determining whether to modify coefficients corresponding to image data in the corresponding region.

14. A method according to claim 9, further comprising a step of permitting adjustment of an amount of emphasis placed on feature strength when the measures of local activity are calculated.

15. A method according to claim 9, further comprising a step of obtaining a lower-resolution version of the image, and wherein the measures of local activity and the measures of local pixel-value variations are based on the lower-resolution version.

16. A method of analyzing an image, comprising:
obtaining an image to be analyzed;
calculating via a central processing unit a fuzzy classification score for each of a plurality of locations in the image, each of the fuzzy classification scores indicating on a sliding scale whether the corresponding location primarily contains (i) background, (ii) at least one of texture or weak edges, or (iii) strong features;
generating and outputting via the central processing unit a map of the fuzzy classification scores, wherein each of the fuzzy classification scores is calculated by determining changes in pixel values along a plurality of different directions; and
differentially processing via the central processing unit the map of the fuzzy classification scores to generate a modified image,
wherein the differential processing is a piece-wise function of data in the image, the piece-wise function comprised of different segments determined b each of the classification scores.

17. A method according to claim 16, further comprising a step of displaying the map of the fuzzy classification scores.

18. A method according to claim 16, wherein one of the fuzzy classification scores is calculated for each pixel in the image, and wherein the fuzzy classification scores are calculated for different regions, each comprising a plurality of pixels.

* * * * *

UNITED STATES PATENT AND TRADEMARK OFFICE
CERTIFICATE OF CORRECTION

PATENT NO.         : 8,818,109 B2
APPLICATION NO.    : 11/481346
DATED              : August 26, 2014
INVENTOR(S)        : Pavel Kisilev et al.

It is certified that error appears in the above-identified patent and that said Letters Patent is hereby corrected as shown below:

In the Claims

In column 14, line 19, in Claim 1, delete "b each" and insert -- by each --, therefor.

In column 14, line 47, in Claim 7, delete "it is" and insert -- is --, therefor.

In column 15, line 3, in Claim 9, delete "b the" and insert -- by the --, therefor.

In column 16, line 20, in Claim 16, delete "b each" and insert -- by each --, therefor.

Signed and Sealed this
Thirtieth Day of December, 2014

Michelle K. Lee
*Deputy Director of the United States Patent and Trademark Office*